No. 624,646. Patented May 9, 1899.
J. D. GROVES.
CORN SHOCKER AND CARRIER.
(Application filed Dec. 19, 1898.)
(No Model.) 2 Sheets—Sheet 1.
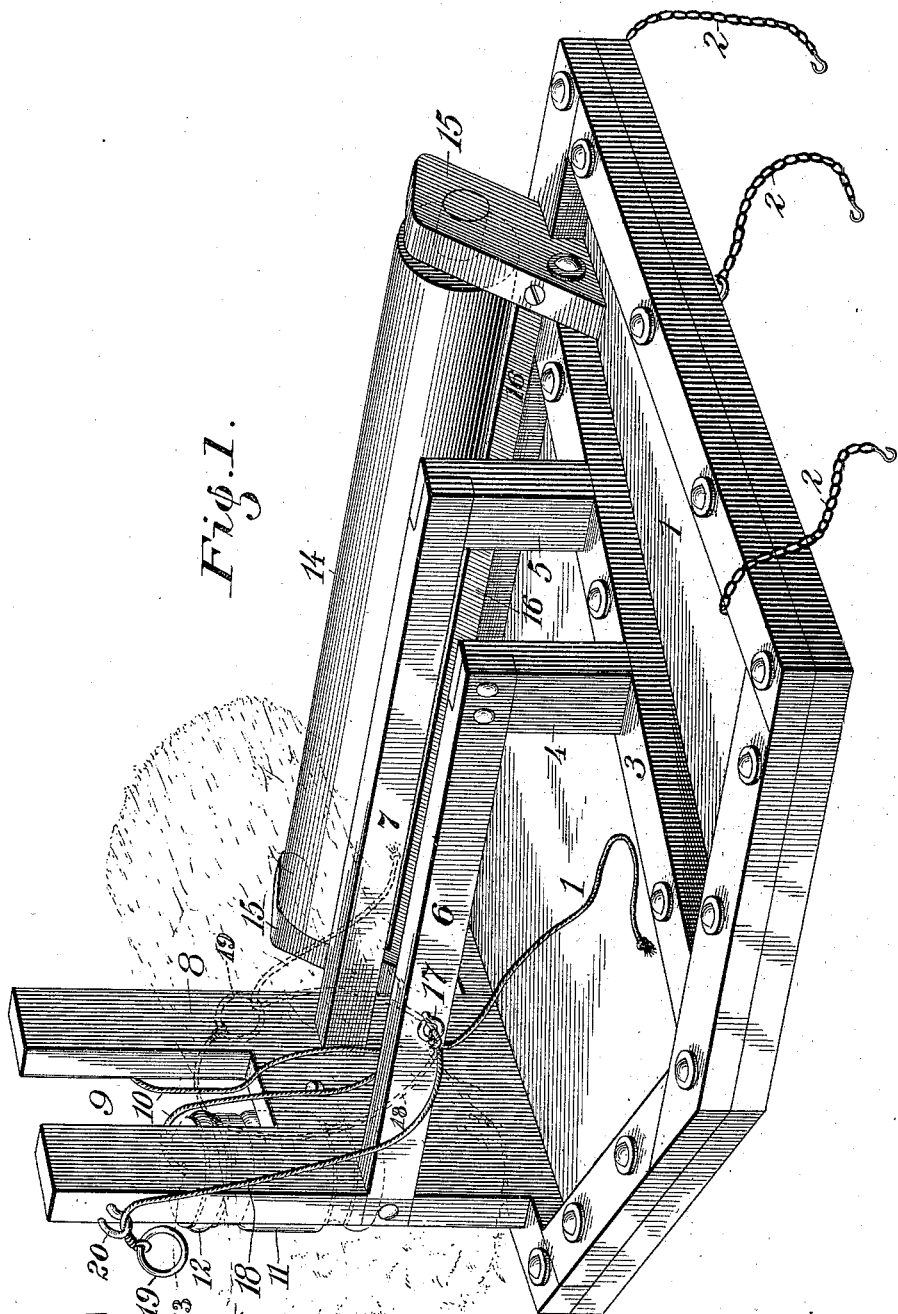
Witnesses
By *his* Attorneys,
Inventor
John D. Groves, No. 624,646. Patented May 9, 1899.
J. D. GROVES.
CORN SHOCKER AND CARRIER.
(Application filed Dec. 19, 1898.)
(No Model.) 2 Sheets—Sheet 2.

Witnesses
John D. Groves
Inventor
By his Attorneys

UNITED STATES PATENT OFFICE.

JOHN D. GROVES, OF MAPLEWOOD, OHIO, ASSIGNOR OF ONE-HALF TO GODFREY GROSS, OF JACKSON CENTRE, OHIO.

CORN SHOCKER AND CARRIER.

SPECIFICATION forming part of Letters Patent No. 624,646, dated May 9, 1899.

Application filed December 19, 1898. Serial No. 699,711. (No model.)

*To all whom it may concern:*

Be it known that I, JOHN D. GROVES, a citizen of the United States, residing at Maplewood, in the county of Shelby and State of Ohio, have invented a new and useful Corn Shocker and Carrier, of which the following is a specification.

My invention relates to a corn-shocking device adapted for use in connection with a corn harvesting and binding machine, and has for its object to provide an improved labor-saving apparatus adapted to receive bundles of cornstalks as they are discharged from the harvester and having means whereby an operator stationed upon the platform of the shocker may compress and bind the bundles to form a shock and subsequently place the shock at the point selected. In the ordinary practice the shocks are formed by hand at points adjacent to the hills from which the stalks are derived, thus scattering the shocks over the surface of the field, whereby in subsequent sowing, and particularly in drilling, much valuable land-space is wasted, as the shocks must be avoided, as are stumps and other obstacles. With a shocker constructed substantially in accordance with my invention, and particularly when the harvesting-machine with which it is employed cuts a single row of hills, the bundles required to make a shock may be carried to the end of the row and the shocks deposited in a row at either side of the field or at its center, according to the size of the field, whereby in subsequent sowing the surface of the field is unobstructed, and in earing the stalks or in gathering the shocks for fodder the sown surface of the field need not be traversed.

Further objects and advantages of this invention will appear in the following description, and the novel features thereof will be particularly pointed out in the appended claims.

Figure 2:
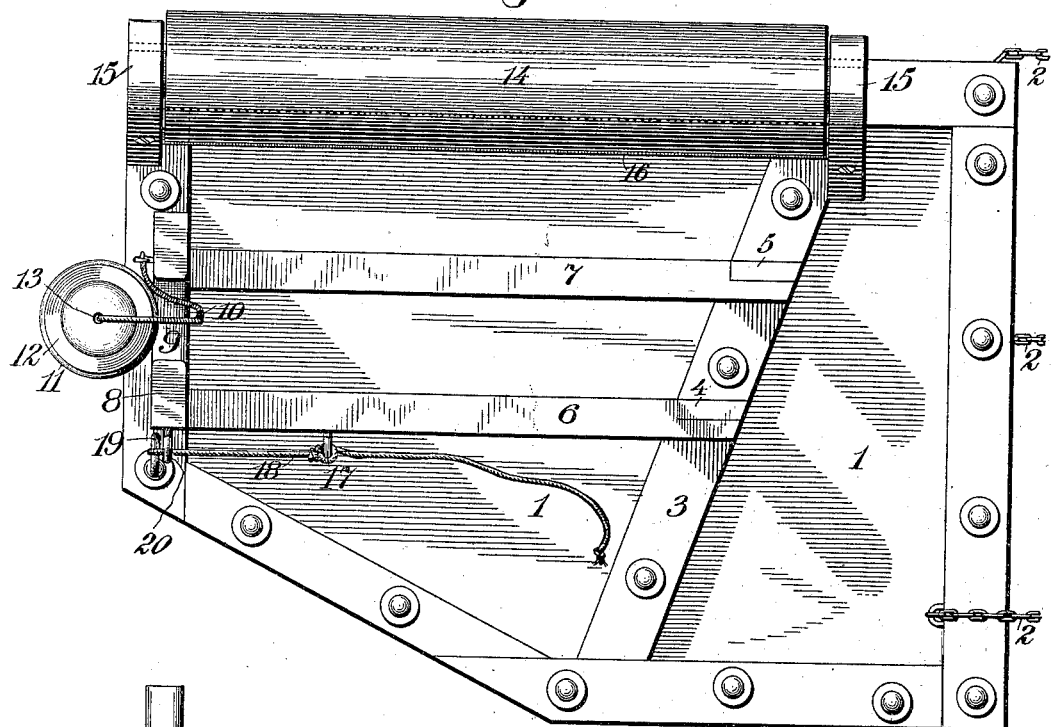
Figure 3:
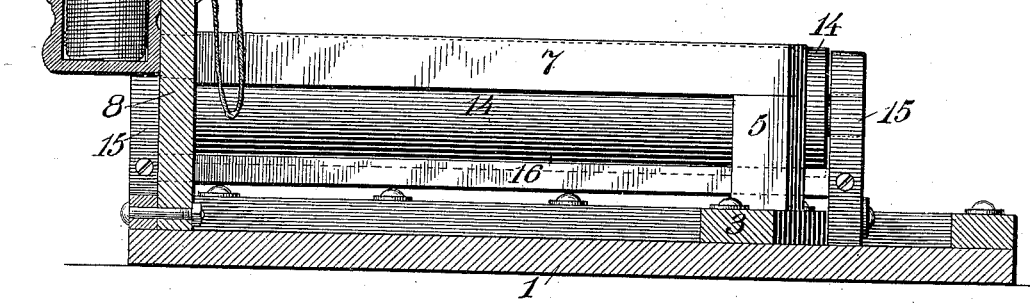

In the drawings, Figure 1 is a perspective view of a shocker constructed in accordance with my invention. Fig. 2 is a plan view. Fig. 3 is a longitudinal section.

Similar reference characters indicate corresponding parts in all the figures of the drawings.

1 designates a platform provided with suitable chains 2 for attachment to the supporting-frame of a harvester or similar machine, said platform being spanned by a horizontal brace 3, from which rise standards 4 and 5, connected by spaced horizontal rests 6 and 7 with an upright 8. In the construction illustrated this upright is bifurcated at its upper end to form a slot 9, through which extends a tie-cord 10 from a supply-receptacle 11. This receptacle is constructed in the form of a box having a removable cover 12, provided with a central outlet or guide opening 13, through which the tie-cord extends.

Parallel with the rest-bars 6 and 7 is a butt-supporting roller 14, having terminal trunnions mounted in bearings in brackets 15, said brackets being connected by a longitudinal brace 16. Also attached intermediately to an eye 17 on one of the rest-bars is a flexible shock-compressing band 18, which may consist of a rope or any equivalent thereof, having at one extremity a draw-ring 19, which may be supported within reach of the operator by a hook 20, preferably located upon the upright 8.

It will be understood that the means of attachment of the platform to the harvesting-machine, which is not shown in the drawings, may be varied to suit the construction of the harvester.

In operation the carrier traverses the field with the harvester, and an operator stationed upon the platform 1 receives the bundles of stalks as they are discharged from the harvester and arranges them transversely upon the rest-bars 6 and 7, with their butts supported by the roller 14. When a sufficient number of bundles have been received to form a shock of the desired size, the compressing-band is passed around the bundles, the free end being extended through the draw-ring 19, and is drawn taut, after which the tie is applied between the planes of the rest-bars 6 and 7, the interval between said rest-bars enabling the operator to apply the tie without difficulty and said slot 9 being located in the vertical plane of the interval between the rest-bars to facilitate the tying operation.

From the above description it will be seen that the apparatus embodying my invention is simple and may be manufactured at a comparatively small cost and also that by the use thereof the harvested stalks may be conveniently carried, if desired, throughout the length of a field to position the shocks at either side thereof to avoid obstructing the center of the field. When a shock reaches the desired point, the elevation by the operator of the tops of the stalks will cause the shock in a complete form to move outwardly upon the roller 14 and right itself upon the ground in the desired position. Furthermore, it will be understood that various changes in the form, proportion, and the minor details of construction may be resorted to without departing from the spirit or sacrificing any of the advantages of the invention.

Having described my invention, what I claim is—

1. A corn shocker and carrier having a platform, parallel spaced rest-bars disposed horizontally and longitudinally in fixed positions above the plane of the platform, and adapted to support stalks arranged horizontally and transversely thereon, preparatory to tying the formed shocks, the elevation of the rest-bars above the platform serving to facilitate the extension of a tie under the stalks thereon, and a butt-supporting roller arranged parallel with the rest-bars, adjacent to one side edge of the platform, and mounted in fixed bearings, to form a rolling fulcrum upon which a completed shock may be rolled and tilted to discharge it laterally from the platform, substantially as specified.

2. A corn shocker and carrier having a platform, a fixed upright arranged at one end of the platform, parallel spaced rest-bars extending longitudinally of the platform from said upright, and disposed above the plane of the platform, shock-tying devices supported by said upright, and a butt-supporting roller mounted in fixed bearings and disposed parallel with the rest-bars above one side edge of the platform, to form a rolling fulcrum upon which a completed shock may be tilted in its lateral discharge from the platform, substantially as specified.

3. A corn shocker and carrier having a platform, a bifurcated upright rising from the platform, spaced rest-bars elevated above the plane of the platform and arranged with the interval therebetween in the vertical plane of the bifurcation of said upright, a tie-supplying receptacle supported by the upright with its feed-opening adjacent to said bifurcation, a butt-supporting roller arranged parallel with the rest-bars and at one side of the platform, and a shock-compressing band, arranged adjacent to one of the rest-bars, substantially as specified.

In testimony that I claim the foregoing as my own I have hereto affixed my signature in the presence of two witnesses.

JOHN D. GROVES.

Witnesses:
WARREN CROTHERS,
H. W. ROBINSON.